US012460270B2

(12) United States Patent
Vanhoute et al.

(10) Patent No.: US 12,460,270 B2
(45) Date of Patent: Nov. 4, 2025

(54) SYSTEMS AND METHODS FOR IDENTIFYING VIRAL CONTAMINANTS

(71) Applicant: Regeneron Pharmaceuticals, Inc., Tarrytown, NY (US)

(72) Inventors: David Vanhoute, Tarrytown, NY (US); Steven Davis, Tarrytown, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 28 days.

(21) Appl. No.: 16/284,133

(22) Filed: Feb. 25, 2019

(65) Prior Publication Data

US 2019/0264293 A1    Aug. 29, 2019

Related U.S. Application Data

(60) Provisional application No. 62/725,543, filed on Aug. 31, 2018, provisional application No. 62/636,546, filed on Feb. 28, 2018.

(51) Int. Cl.

| | | |
|---|---|---|
| C12Q 1/70 | (2006.01) | |
| C12N 15/10 | (2006.01) | |
| C12Q 1/6806 | (2018.01) | |
| C12Q 1/6809 | (2018.01) | |
| C12Q 1/6848 | (2018.01) | |

(Continued)

(52) U.S. Cl.
CPC ............ *C12Q 1/70* (2013.01); *C12N 15/1003* (2013.01); *C12Q 1/6806* (2013.01); *C12Q 1/6809* (2013.01); *C12Q 1/6848* (2013.01); *C12Q 1/6869* (2013.01); *C12Q 1/6888* (2013.01); *C12Q 2535/122* (2013.01)

(58) Field of Classification Search
CPC .. C12Q 1/6809; C12Q 1/6869; C12Q 1/6888; C12Q 1/70
See application file for complete search history.

(56) References Cited

U.S. PATENT DOCUMENTS

| | | |
|---|---|---|
| 5,173,418 A | 12/1992 | Pharma |
| 7,087,411 B2 | 8/2006 | Daly et al. |
| 7,279,159 B2 | 10/2007 | Daly et al. |

(Continued)

FOREIGN PATENT DOCUMENTS

| | | |
|---|---|---|
| EP | 2253701 A1 | 11/2010 |
| TW | 202000922 A | 1/2020 |
| WO | 2019/168774 A1 | 9/2019 |

OTHER PUBLICATIONS

Richards, B. et al. PDA Journal of Pharmaceutical Science and Technology 68(6):651 (Nov.-Dec. 2014). (Year: 2014).*

(Continued)

*Primary Examiner* — Diana B Johannsen
(74) *Attorney, Agent, or Firm* — McCarter & English, LLP

(57) ABSTRACT

The present disclosure is directed to a streamlined sample preparation process, VERA (Viral Enrichment by Reducing Artifacts), to tilt total genomic material in favor of DNA/RNA viral genomes. This reduction of host genomic artifacts can be completed in <8 hours from sample acquisition. Using a rapid library preparation protocol (~1.5 minutes) and real-time nanopore sequencing, potential viral contamination, for example RNA viral contamination, can be identified in less than one workday from sample acquisition.

23 Claims, 5 Drawing Sheets

(51) Int. Cl.
*C12Q 1/6869* (2018.01)
*C12Q 1/6888* (2018.01)

(56) References Cited

U.S. PATENT DOCUMENTS

| | | |
|---|---|---|
| 7,582,298 B2 | 9/2009 | Stevens et al. |
| 8,043,617 B2 | 10/2011 | Stevens et al. |
| 8,062,640 B2 | 11/2011 | Sleeman et al. |
| 8,309,088 B2 | 11/2012 | Macdonald et al. |
| 8,735,095 B2 | 5/2014 | Martin et al. |
| 8,871,209 B2 | 10/2014 | Stitt et al. |
| 8,945,559 B2 | 2/2015 | Dix et al. |
| 9,018,356 B2 | 4/2015 | Sleeman et al. |
| 9,079,948 B2 | 7/2015 | Orengo et al. |
| 9,132,192 B2 | 9/2015 | Daly et al. |
| 9,173,880 B2 | 11/2015 | Dix et al. |
| 9,228,014 B2 | 1/2016 | Classon et al. |
| 9,260,515 B2 | 2/2016 | Stitt et al. |
| 9,265,827 B2 | 2/2016 | Wiegand et al. |
| 9,302,015 B2 | 4/2016 | Papadopoulos et al. |
| 9,353,176 B2 | 5/2016 | Macdonald et al. |
| 2003/0044771 A1 | 3/2003 | Anderson |
| 2014/0044730 A1 | 2/2014 | Yancopoulos et al. |
| 2014/0088295 A1 | 3/2014 | Smith et al. |
| 2014/0271642 A1 | 9/2014 | Murphy et al. |
| 2014/0271653 A1 | 9/2014 | Gurnett-Bander et al. |
| 2014/0271658 A1 | 9/2014 | Murphy et al. |
| 2014/0271681 A1 | 9/2014 | Martin et al. |
| 2015/0203579 A1 | 7/2015 | Papadopoulos et al. |
| 2015/0203580 A1 | 7/2015 | Papadopoulos et al. |
| 2015/0259423 A1 | 9/2015 | Kirshner et al. |
| 2015/0266966 A1 | 9/2015 | Smith et al. |
| 2015/0313194 A1 | 11/2015 | Hu et al. |
| 2015/0337029 A1 | 11/2015 | Kyratsous et al. |
| 2015/0337045 A1 | 11/2015 | Okamoto et al. |
| 2016/0017029 A1 | 1/2016 | Walsh et al. |
| 2016/0075778 A1 | 3/2016 | Okamoto et al. |
| 2016/0215040 A1 | 7/2016 | Kyratsous et al. |

OTHER PUBLICATIONS

Killianski, A. et al. Emerging Infectious Diseases 22(8):1448 (Aug. 2016). (Year: 2016).*
Dietz, J. et al. Neonatology 101:55 (Jul. 2011). (Year: 2011).*
Johnson, S.A. et al. Biotechnology Bioengineering 114(1):21 (Jan. 2017; online Aug. 2016). (Year: 2016).*
Qiagen, QIAamp Viral RNA Mini kit (52904) Handbook (48 pages)(Jul. 2020). (Year: 2020).*
Ambion, TURBO Dna-free Kit (AM1907) (10 pages) (Oct. 2012). (Year: 2012).*
Kircher, M. et al. Bioessays 32:524-536. (Year: 2010).*
Ungerechts, G. et al. Molecular Therapy—Methods & Clinical Development 3:16018; coi:10.1038/mtm.2016.18. Apr. 2016. (Year: 2016).*
Herzyk, P. Definition of "DNA library", from Chapter 8 "Next-Generation Sequencing" (8.3.1.1 "DNA Library Preparation"), Handbook of Pharmacogenomics and Stratified Medicine (2014). (Year: 2014).*
Leggett, R.M. et al. Rapid MINION metagenomic profiling of the preterm infant gut microbiota to aid in pathogen diagnostics. bioRXIV preprint, dx.doi.org/10.1101/18406, 25 pages (Aug. 24, 2017). (Year: 2017).*
Alexander L. Greninger et al: "Rapid metagenomic identification of viral pathogens in clinical samples by real-time nanopore sequencing analysis", Genome Medicine, vol. 7, No. I, 2015.
Yu X. Jack: Trends & Developments in BioProcess Technology Trends & Developments in BioProcess Technology A Production of BioProcess Technology Network A Production of BioProcess Technology Network Summer 2013 @BULLET vol. 12 / Issue 2 @Bullet ISSN 1538-8786 Summer 2013.
Khan, AS., et al., "A Multicenter Study to Evaluate the Performance of High-Throughput Sequencing for Virus Detection," mSphere, 2(5):e00307-17 (2017).
Mccabe, M., et al., "Simultaneous detection of DNA and RNA virus species involved in bovine respiratory disease by PCR-free rapid tagmentation-based library preparation and MinION nanopore sequencing," bioRxiv, 269936 (2018).
International Search Report of the International Searching Authority released Apr. 15, 2019; 4 pages, PCT/US19/019355.
Written Opinion of the International Searching Authority released Apr. 15, 2019; 6 pages, PCT/US19/019355.
International Preliminary Report on Patentability received for PCT Patent Application No. PCT/US19/19355, mailed on Sep. 10, 2020, 8 pages.

* cited by examiner

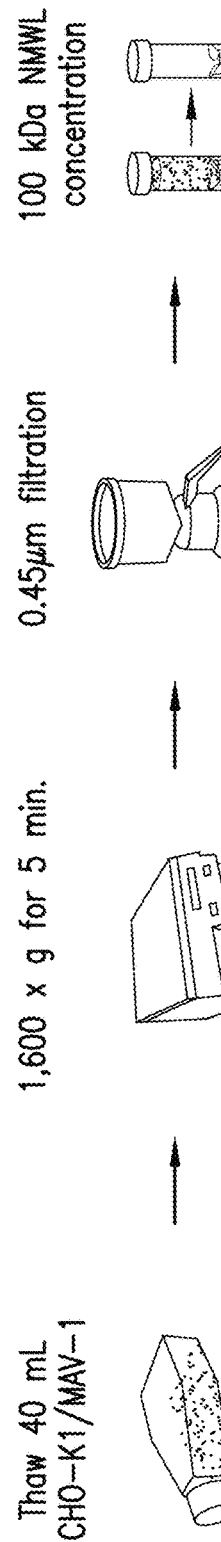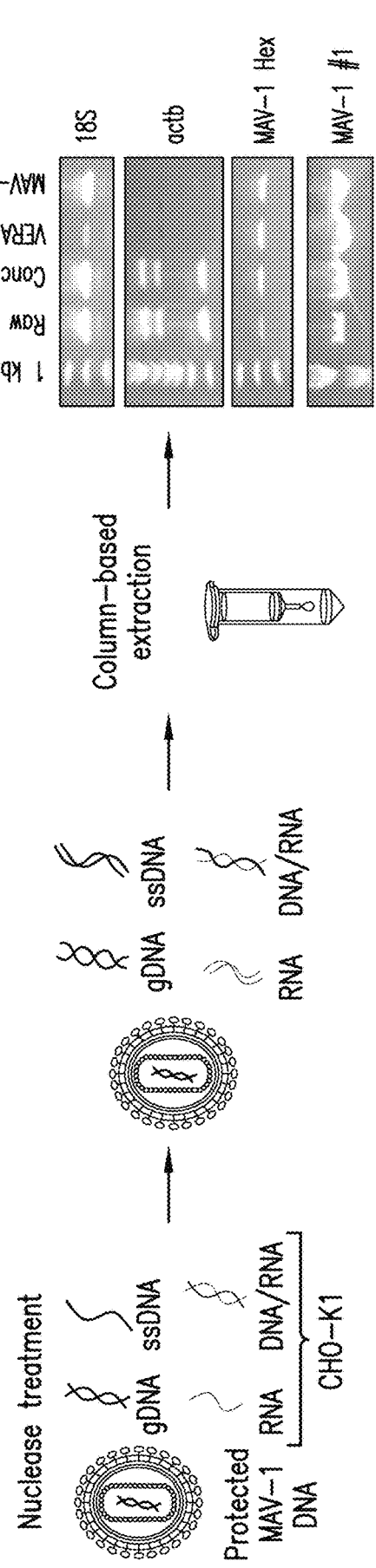

SYSTEMS AND METHODS FOR IDENTIFYING VIRAL CONTAMINANTS

TECHNICAL FIELD OF THE INVENTION

The invention is generally directed to methods of sequencing nucleic acids, in particular viral nucleic acid sequences present in cell cultures.

BACKGROUND OF THE INVENTION

Next-Generation Sequencing (NGS) and other High-Throughput Sequencing (HTS) platforms have the potential to redefine viral safety testing in the biopharmaceutical industry. Although polymerase chain reaction (PCR)-based approaches are sensitive, inexpensive, and rapid, NGS-based approaches allow for the broad testing of all viral genomes present in a particular clinical or manufacturing sample. Leveraging this technology as a tool for systemic surveillance of potential contaminants during the manufacturing process has been hampered by the workflow required for metagenotnic detection of adventitious agents. Specifically, optimization of sample preparation strategies, streamlined and automated library preparation, and time sensitive data analysis workflows are required for adopting NGS technologies for routine viral screening measures.

Viral genomes are complex and diverse with RNA viruses specifically complicating adequate library preparation during de novo HTS workflows. In contrast to contamination by microbes and mycoplasma, which can be relatively easily detected, viral contamination present a serious threat because of the difficulty in detecting some viruses and the lack of effective methods of treating infected cell cultures.

Thus, there is a need for new methods for detecting and identifying virus contamination in cell culture.

SUMMARY OF THE INVENTION

One embodiment provides a streamlined sample preparation process, VERA (Viral Enrichment by Reducing Artifacts), to tilt total genomic material in favor of viral genomes. This reduction of host genomic material can be completed in <8 hours from sample acquisition. Using a rapid library preparation protocol ~15 minutes) and real-time nanopore sequencing, potential viral contamination can be identified in less than one workday from sample acquisition.

FIG. 1 is a diagram of an exemplary method for detecting and identifying viral nucleic acids in a cell culture sample. The method for identifying viral nucleic acids in a cell culture sample includes lysing eukaryotic cells in a sample of a cell culture. The cell lysis can be performed using mechanical lysis techniques such as sonication or homogenization. A preferred method for lysing the cells is a conventional freeze-thaw technique. Once the cells in the cell culture are lysed, cellular debris is removed from the sample. The cellular debris can be removed using conventional techniques including but not limited to centrifugation, size filtration, or a combination thereof. Once a majority of the cellular debris is removed from the sample, the sample is concentrated to produce a retentate. The retentate is then treated with nucleases to digest eukaryotic nucleic acids. Because viral particles protect viral nucleic acids, the viral nucleic acids are not digested by the nuclease treatment. In one embodiment, the retentate is treated with a combination of Benzonase®, OmniCleave™, and RiboShredder™ to digest host cell DNA and RNA in the culture. After treatment with the nucleases, viral nucleic acids are extracted from the retentate. The viral nucleic acids are sequenced, for example by real time nanopore sequencing, and identified without amplification. In certain embodiments, the viral reads obtained from the sequencing are greater than cellular nucleic acid reads obtained from the sequencing.

In another embodiment of the disclosed methods, the viral reads are at least 51% of the total reads obtained from the sequencing, or are between 50 to 99% of the total reads obtained from the sequencing, or are at least 80%, 85%, or 90% of the total reads obtained from the sequencing.

Generally, the cells in the cell culture are eukaryotic cells, for example Chinese Hamster Ovary cells. In some embodiments, the cells secrete a protein drug product. The protein drug product can be an antibody or antigen binding fragment thereof, a fusion protein, or a recombinant protein.

In certain embodiments the virus is an RNA virus, a DNA virus or a combination thereof. The virus can be single stranded or double stranded. Exemplary viruses that can be detected include but are not limited to Minute virus of mice (MVM), MSV1, P12/EMC, Mouse Encephalomyelitis virus, Mouse Adenovirus, lactate dehydrogenase virus (LDV), Polyoma virus, mouse hepatitis virus (MHV) Sendai virus, lymphocytic choriomeningitis virus (LCM), Reo-virus type 3, Kilham rat virus, and Toolan's H-1 virus.

BRIEF DESCRIPTION OF THE DRAWINGS

FIGS. 1A-1H are a diagram of one embodiment of a method for detecting viral nucleic acids in cell culture.

DETAILED DESCRIPTION OF THE INVENTION

I. Definitions

Figure 2:
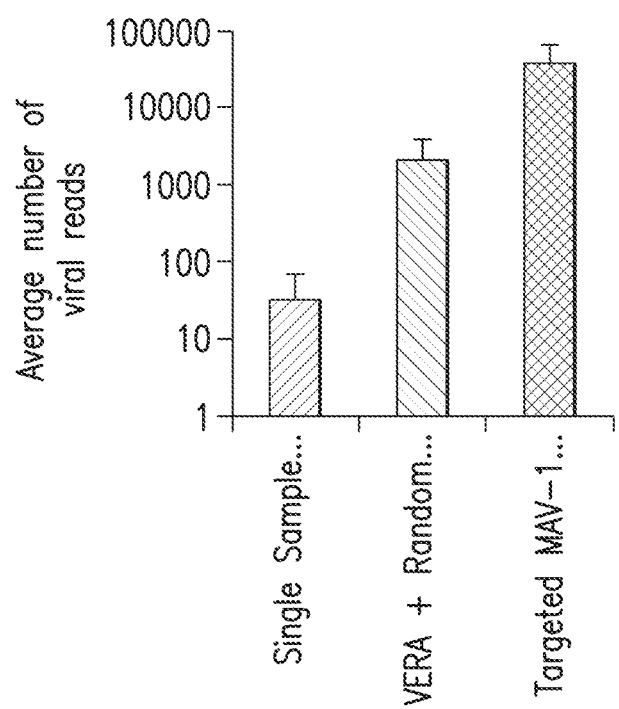
FIG. 2 is a bar graph of average number of viral reads for a single sample, VERA with random primer PER, and VERA with targeted primer PCR.

The use of the terms "a," "an," "the," and similar referents in the context of describing the presently claimed invention (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−10%; in other embodiments the values may range in value either above or below the stated value in a range of approx. +/−5%; in other embodiments the values may range in value either above or below the stated value in a range of approx. +/−2%; in other embodiments the values may range in value either above or below the stated value in a range of approx. +/−1%. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The term "read" with regard to sequencing refers to the nucleic acid sequence of a cluster of nucleotides that is obtained after the end of the sequencing process and which is ultimately the sequence of a section of a complete nucleic acid sequence. A "read" is the basecalled value of a string of nucleotides derived from a raw signal.

"Protein" refers to a molecule comprising two or more amino acid residues joined to each other by a peptide bond. Protein includes polypeptides and peptides and may also include modifications such as glycosylation, lipid attachment, sulfation, gamma-carboxylation of glutamic acid residues, alkylation, hydroxylation and ADP-ribosylation. Proteins can be of scientific or commercial interest, including protein-based drugs, and proteins include, among other things, enzymes, ligands, receptors, antibodies and chimeric or fusion proteins. Proteins are produced by various types of recombinant cells using well-known cell culture methods, and are generally introduced into the cell by genetic engineering techniques (e.g., such as a sequence encoding a chimeric protein, or a codon-optimized sequence, an intronless sequence, etc.) where it may reside as an epi some or be integrated into the genome of the cell.

"Antibody" refers to an immunoglobulin molecule consisting of four polypeptide chains, two heavy (H) chains and two light (L) chains inter-connected by disulfide bonds. Each heavy chain has a heavy chain variable region (HCVR or VH) and a heavy chain constant region. The heavy chain constant region contains three domains, CH1, CH2 and CH3. Each light chain has a light chain variable region and a light chain constant region. The light chain constant region consists of one domain (CL). The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. The term "antibody" includes reference to both glycosylated and non-glycosylated immunoglobulins of any isotype or subclass. The term "antibody" includes antibody molecules prepared, expressed, created or isolated by recombinant means, such as antibodies isolated from a host cell transfected to express the antibody. The term antibody also includes bispecific antibody, which includes a heterotetrameric immunoglobulin that can bind to more than one different epitope. Bispecific antibodies are generally described in U.S. Patent Application Publication No. 2010/0331527, which is incorporated by reference into this application.

"Cell culture" refers to the propagation or proliferation of cells in a vessel, such as a flask or bioreactor, and includes but is not limited to fed-batch culture, continuous culture, perfusion culture and the like.

Benzonase® refers to a genetically engineered endonuclease from *Serratia marcescens* produced in *Escherichia coli* strain W3110 which contains a proprietary pNUC1 production plasmid (U.S. Pat. No. 5,173,418).

OmniCleave™ refers to OmniCleave™ Endonuclease which is a highly purified enzyme from a recombinant *E. coli* strain that degrades single- and double-stranded DNA and RNA to di-, tri-, and tetranucleotides. OmniCleave Endonuclease has the same substrate specificity and yields the same products as Benzonase®, an enzyme derived from *Serratia marcescens*.

RiboShredder™ refers to a proprietary blend of non-mammalian RNases that completely degrade unwanted RNA in DNA and protein purification procedures. RiboShredder™ is commercially available from Epicentre.

As used herein, "amplification" refers to the production of multiple copies of a segment of DNA or RNA. Amplification is usually induced by polymerase chain reaction.

As used herein, "PCR" refers to polymerase chain reaction which is a molecular biology technique used to amplify a single copy of a segment of DNA, or RNA, generating thousands to millions of copies of a particular DNA or RNA sequence. PCR is commonly used to amplify the number of copies of a DNA or RNA segment for cloning or to be used in other analytical procedures.

The term "real time nanopore sequencing" refers to sequencing analysis while sequencing is progressing due to current disruption by nucleic acid molecules through nanopores.

II. Methods for Detecting Viruses in Cell Culture

A representative method for identifying and sequencing viruses present in cell culture includes the following steps: lysing the cells being cultured, removing cellular debris, concentrating the sample to enrich for viral nucleic acids, enzymatically digesting nucleic acids released from the cells that are present in the enriched sample, extracting viral nucleic acids from the digested sample, and sequencing the viral nucleic acids to identify the virus.

A. Lysing Cells

The cell culture sample is treated to disrupt or lyse the cells being cultured. Typically the cells are eukaryotic cells such as Chinese Hamster Ovary cell. Examples of other cells and cell lines that can be used in cell culture are provided below.

Techniques for lysing cells are well known in the art. In preferred embodiment, the cells are lysed using a freeze-thaw technique. For example cell flasks are typically frozen overnight and then thawed prior to use.

In one embodiment, the cells are lysed using mechanical devices including, but not limited to a Waring Blender and a Polytron. Rotating blades grind and disperse cells and tissues.

In another embodiment, the cell are subjected to Liquid Homogenization, for example using a Dounce Homogenizer, Potter-Elvehjem Homogenizer or a French press. Cell or tissue suspensions are sheared by forcing them through a narrow space In another embodiment, the cells are lysed by sonication using a sonicator. High frequency sound waves shear cells.

B. Removing Cellular Debris

Lysing the cells generates cellular debris. The cellular debris can be removed using conventional techniques such as centrifugation, size filtration, or a combination thereof.

1. Centrifugation

In one embodiment, cellular debris is removed using low speed centrifugation. Typically, the sample is clarified by centrifuging the sample at 1,600×g for 5 min. The supernatant is then removed.

2. Filtration

In one embodiment the cellular debris is removed by filtering the sample. For example, the sample can be filtered using filter with pores having a diameter of 0.2 to 0.45 μm. Suitable filters are commercially available. In certain embodiments, the sample is first centrifuged, and the supernatant is then filtered to remove additional cellular debris including but not limited to organelles such as the nucleus. In another embodiment the sample is filtered using a 0.8 μm filter.

The resulting filtrate is then concentrated.

C. Concentrating the Sample

The filtrate is concentrated for example by using an Amicon® 100 kDa concentrator and following the manufacturer's instructions. Other ways of concentrating the filtrate increase total viral nucleic acid retrieval include, but are not limited to lyophilization. In one embodiment, the sample is concentrated by diafiltration.

D. Nuclease Treatment

The concentrated sample is then treated with nucleases to digest nucleic acids from the cells in the cell culture. Infecting virus is immune to nuclease treatment at this step due to the protective nature of viral capsids.

In one embodiment, the concentrated sample is treated with Benzonase®, OmniCleave™, RiboShredder™, and combinations thereof. RNAse Cocktail Mix (Ambion® RNase Cocktail™ is a mixture of two highly purified ribonucleases, RNase A (500 U/mL) and RNase T1 (20,000 U/mL) can also be used.

In one embodiment, two viral filtrate volumes are distributed separately across Amicon 15 microconcentrators with a 100 kDa pass filter. Phosphate buffered saline solution can be used if necessary to balance the tubes. The tubes are spun for 15 min at maximum speed on an Allegra 6 centrifuge. The retentate volume is checked. Tubes are spun for another 15 mins at maximum speed if necessary. The retentate volume in each microconcentrator should be approximately 200 μL. The retentate is carefully removed from each microconcentrator and the retentates are pooled in a new tube. 50 μL of the total retentate is removed from each sample and labeled as Sample DP and Sample DR.

1× Nase buffer is added to the two separate pooled retentates to bring the volume up to 4 mL Concentrate in an Amicon 4 as done in Step 4.4 but down to a volume of 50 μL to 200 μL.

To the volume of each buffer exchanged retentate, add 2× volume of OmniCleave, 2× volume of Benzonase, 2× volume of RNase Cocktail Enzyme Mix, and sufficient 10× DNase buffer is added so that final is 1× DNase buffer. The tubes are incubated in a thermomixer at 37° C. at 1000 RPM for 2 hours.

Other nucleases that can be used include, but are not limited to DNAse I, DNAse II, Nuclease S1, RNAse A, RNAse B, RNAse I, RNAse T1, RNAse T2, RNAse H, exonuclease I, exonuclease II, exonuclease III, exonuclease IV, exonuclease V, lambda exonuclease, endonuclease I, endonuclease II, endonuclease III, endonuclease IV, endonuclease V, endonuclease VI, endonuclease VII, endonuclease VIII, and site specific endonucleases including but not limited to AatII, Acc, AccI, AclI, AatII, Acc65I, AccI, AclI, AfeI, AflII, AgeI, ApaI, ApaLI, ApoI, AscI, AseI, AsiSI, AvrII, BamHI, BclI, BglII, Bmel580I, BmtI, BsaHI, BsiEI, BsiWI, BspEI, BsrGI, BssHII, BstBI, BstZl7I, BtgI, ClaI, DraI, EaeI, EagI, EcoRI, EcoRV, FseI, FspI, HaeII, HincII, HindIII, HpaI, KasI, KpnI, MfeI, MluI, MscI, MspAII, MfeI, MluI, MscI, NaeI, NarI, NcoI, NdeI, NgoMIV, NheI, NotI, NruI, NsiI, NspI, PacI, PciI, PmeI, PmlI, PsiI, PspOMI, PstI, PvuI, PvuII, SacI, SacII, SalI, SbfI, ScaI, SfcI, SfoI, SgrAI, SmaI, SmlI, SnaBI, SpeI, SphI, SspI, StuI, SwaI, XbaI, XhoI, and XmaI.

In one embodiment a sample is treated with one or more nucleases for 2 hr digestion on a shaker at 37° C. (i.e., Thermomixer). A 2× Nuclease:retentate volume is sufficient (2× OmniCleave, 2× Benzonase, 2× RNAse Cocktail). Additionally 10× DNAse buffer is added to a final concentration of 1×. Thus differing sample volumes can be treated by easily scaling up or down the ratio of enzyme:retentate.

E. Extraction of Viral Nucleic Acids

After digestion with the nuclease cocktail, viral nucleic acids are extracted from the sample. In one embodiment 0.5 M EDTA is added to tubes prior to extraction to a final concentration of 3 mM EDTA, The viral nucleic acids can be extracted using a PureLink™ Viral RNA/DNA Mini Kit from ThermoFisher.

To prepare the Wash Buffer, 60 mL 96-100% ethanol is added to 15 mL Wash Buffer (WII) included with the kit. A check is placed on the Wash Buffer label to indicate the ethanol is added, and is at room temperature.

The Carrier RNA is prepared using 5.6 μg Carrier RNA per sample (for ≤500 μL, sample). Less Carrier RNA per sample can be used, but the amount of Carrier RNA needed for each sample type and downstream application should be validated.

To prepare Carrier RNA (5.6 μg/sample):

1. Add 310 μL RNase-free Water (included with the kit) to 310 μg lyophilized Carrier RNA supplied in a tube with the kit to obtain 1 μg/μL Carrier RNA stock solution.

2. Mix thoroughly and aliquot the solution into smaller aliquots. Store the aliquots at −20° C.

Avoid repeated freezing and thawing.

3. Calculate the volume of Lysis Buffer/Carrier RNA mix required to process the desired number of samples simultaneously using the following formula:

N×0.21 mL (volume of Lysis Buffer/reaction)=A mL

A mL×28 μL/mL=B μL where

N=number of samples

A=calculated volume of Lysis Buffer (L22)

B=calculated volume of 1 μg/μL Carrier RNA stock solution to add to Lysis Buffer (L22)

4. Thaw the required amount of 1 μg/μL Carrier RNA stock solution.

5. In a sterile tube, add the volume of Carrier RNA stock solution (B, calculated as above) to the volume of Lysis Buffer (A, calculated as above). Mix gently by pipetting up and down. Avoid vortexing as it generates foam.

6. Store at 4° C. until use. Use the buffer within 1 hour.

To Prepare Lysates

The lysate preparation protocol is described below for 200 μL starting material. If you wish to process >200 μL (≤500 μL) sample volume, scale-up the reagent volumes accordingly.

1. Add 25 μL Proteinase K into a sterile microcentrifuge tube.

2. Add 200 μL of cell-free sample into the microcentrifuge tube.

Note: If you are processing <200 μL sample, adjust final volume of the sample to 200 μL using PBS (phosphate buffered saline) or 0.9% NaCl.

3. Add 200 µL Lysis Buffer (containing 5.6 µg Carrier RNA). Close the tube lid and mix by vortexing, for 15 seconds.
4. Incubate at 56° C. for 15 minutes.
5. Add 250 µL 96-100% ethanol to the tube, close the lid, and mix by vortexing for 15 seconds.
6. Incubate the lysate for 5 minutes at room temperature.
To Purify
1. Add above lysate to the Viral Spin Column in a collection tube.
2. Centrifuge the column at 6800×g for 1 minute. Discard the collection tube. Place the spin column in a new Wash Tube.
3. Wash the column with 500 µL Wash Buffer (WII) with ethanol. Centrifuge at 6800×g for 1 minute. Discard the flow through.
4. Repeat wash Step 3 with 500 µL Wash Buffer (WII) once.
5. Discard the collection tube and place the spin column in another, clean Wash Tube.
6. Centrifuge the spin column at maximum speed for 1 minute to remove any residual Wash Buffer (WII).
7. Place the spin column in a clean 1.7-mL Recovery Tube.
8. Elute with 10-50 µL sterile RNase-free water (E3) supplied with the kit (add water to the center of the cartridge).
9. Incubate at room temperature for 1 minute, Centrifuge the spin column at maximum speed for 1 minute to elute nucleic acids. The Recovery Tube contains purified viral nucleic acids. Discard the spin column.
10. Store purified viral RNA/DNA at −80° C. or use RNA/DNA for the desired downstream application.
F. Sequencing Once the viral nucleic acids are extracted, library preparation for sequencing can commence. Importantly, the viral nucleic acids are not amplified prior to sequencing. In one embodiment library preparation was performed with either SQK-LSK308 (1D2) or SQK-RAD004 (Rapid) ONT library preparation kits following manufacturer's instructions. SQK-RAD004 is a 15 minute rapid library preparation kit while SQK-LSK308 is a longer (~3 hr) more robust library preparation.

In a preferred embodiment, a 3rd-generation sequencer (MinION™) from Oxford Nanopore Technologies is used to sequence the viral nucleic acids. The MinION™ is a small portable sequencer that generates sequencing data in real time, greatly reducing the time from sample receipt to contaminant identification. Native sequencing of adventitious agent nucleic acid also eliminates the need for time consuming amplification steps (targeted or de novo). Data is analyzed using ONT's WIMP software, a platform that aligns reads to viral, bacterial, and fungal databases from RefSeq and is periodically updated. Corresponding "Eukaryotic" or "Bacterial" alignments represent false positives most likely derived from partial alignments of CHO (host) reads to the Fungal (Eukaryotic) database or contaminants from reagents.

In a preferred embodiment, the viral nucleic acids are sequenced by RT-PCR. As used herein, "RT-PCR" refers to reverse transcription polymerase chain reaction which is a valiant of traditional PCR. RT-PCR is a molecular biology technique used to quantitatively detect gene expression through the creation of complementary DNA (cDNA) transcripts from RNA. During RT-PCR, RNA molecules are converted into their cDNA sequences by reverse transcriptase enzymes. The primers used for cDNA synthesis can be either non-sequence specific primers (such as a mixture of random hexamers or oligo-dT primers), or sequence specific primers. Random hexamers are a mixture of all possible combinations of six nucleoptide sequences that can attach randomly to the entire RNA pool. Oligo-dT primers are complementary to the poly-A tail of mRNA molecules, and can be used to synthesize cDNA from mRNA molecules only. Traditionally, the cDNA synthesized from mRNA is amplified using standard PCR procedures.

Viruses that can be detected and sequenced using the disclosed methods include, but are not limited to Hantavirus, Lymphocytic choriomeningitis virus, rat rotavirus, reovirus type 3, sendaivirus, ectromelia virus, K virus, Kilham rat virus, P12, EMC, MAV1, lactate dehydrogenase virus, minute virus of mice, Theiler's virus, mouse hepatitis virus, mouse rotavirus, polyomavirus, rat coronavirus retrovirus, sialoacryoadenitis virus, thymic virus, HI virus, murine leukemia virus, and bovine viral diarrhea virus.

Human viral pathogens that infect cell culture include but are not limited to adenovirus, cytomegalovirus, enterviruses, herpes simplex virus, influenza virus, parainfluenza virus, rhinovirus, respiratory syncytial virus, and varicella zoster virus.

III. Proteins of Interest

The cells in the cell cultures disclosed herein typically express or secrete a protein of interest. Any protein of interest suitable for expression in prokaryotic or eukaryotic cells can be used in the engineered host cell systems provided. For example, the protein of interest includes, but is not limited to, an antibody or antigen-binding fragment thereof, a chimeric antibody or antigen-binding fragment thereof, an ScFv or fragment thereof, an Fc-fusion protein or fragment thereof, a growth factor or a fragment thereof, a cytokine or a fragment thereof, or an extracellular domain of a cell surface receptor or a fragment thereof. Proteins of interest may be simple polypeptides consisting of a single subunit, or complex multi subunit proteins comprising two or more subunits. The protein of interest may be a biopharmaceutical product, food additive or preservative, or any protein product subject to purification and quality standards.

In some embodiments, the protein product (protein of interest) is an antibody, a human antibody, a humanized antibody, a chimeric antibody, a monoclonal antibody, a multispecific antibody, a bispecific antibody, an antigen binding antibody fragment, a single chain antibody, a diabody, triabody or tetrabody, a Fab fragment or a F(ab')2 fragment, an IgD antibody, an IgE antibody, an IgM antibody, an IgG antibody, an IgG1 antibody, an IgG2 antibody, an IgG3 antibody, or an IgG4 antibody. In one embodiment, the antibody is an IgG1 antibody. In one embodiment, the antibody is an IgG2 antibody. In one embodiment, the antibody is an IgG4 antibody. In one embodiment, the antibody is a chimeric IgG2/IgG4 antibody. In one embodiment, the antibody is a chimeric IgG2/IgG1 antibody. In one embodiment, the antibody is a chimeric IgG2/IgG1/IgG4 antibody.

In some embodiments, the antibody is selected from the group consisting of an anti-Programmed Cell Death 1 antibody (e.g. an anti-PD1 antibody as described in U.S. Pat. Appln. Pub. No. US2015/0203579A1), an anti-Programmed Cell Death Ligand-1 (e.g. an anti-PD-L1 antibody as described in in U.S. Pat. Appln. Pub. No. US2015/0203580A1), an anti-Dll4 antibody, an anti-Angiopoetin-2 antibody (e.g. an anti-ANG2 antibody as described in U.S. Pat. No. 9,402,898), an anti-Angiopoetin-Like 3 antibody (e.g. an anti-AngPtl3 antibody as described in U.S. Pat. No. 9,018,356), an anti-platelet derived growth factor receptor antibody (e.g. an anti-PDGFR antibody as described in U.S. Pat. No. 9,265,827), an anti-Erb3 antibody, an anti-Prolactin Receptor antibody (e.g. anti-PRLR antibody as described in U.S. Pat. No. 9,302,015), an anti-Complement 5 antibody (e.g. an antiC-5 antibody as described in U.S. Pat. Appln. Pub. No US2015/0313194A1), an anti-TNF antibody, an anti-epidermal growth factor receptor antibody (e.g. an anti-EGFR antibody as described in U.S. Pat. No. 9,132,192 or an anti-EGFRvIII antibody as described in U.S. Pat. Appln. Pub. No. US2015/0259423A1), an anti-Proprotein Convertase Subtilisin Kexin-9 antibody (e.g. an anti-PCSK9 antibody as described in U.S. Pat. No. 8,062,640 or U.S. Pat. Appln. Pub. No. US2014/0044730A1), an anti-Growth And Differentiation Factor-8 antibody (e.g. an anti-GDF8 antibody, also known as anti-myostatin antibody, as described in U.S. Pat. No. 8,871,209 or 9,260,515), an anti-Glucagon Receptor (e.g. anti-GCGR antibody as described in U.S. Pat. Appln. Pub. Nos. US2015/0337045A1 or US2016/0075778A1), an anti-VEGF antibody, an anti-IL1R antibody, an interleukin 4 receptor antibody (e.g. an anti-IL4R antibody as described in U.S. Pat. Appln. Pub. No. US2014/0271681A1 or U.S. Pat No. 8,735,095 or 8,945,559), an anti-interleukin 6 receptor antibody (e.g. an anti-IL6R antibody as described in U.S. Pat. No. 7,582,298, 8,043,617 or 9,173,880), an anti-IL1 antibody, an anti-IL2 antibody, an anti-IL3 antibody, an anti-IL4 antibody, an anti-IL5 antibody, an anti-IL6 antibody, an anti-IL7 antibody, an anti-interleukin 33 (e.g. anti-IL33 antibody as described in U.S. Pat. Appln. Pub. Nos. US2014/0271658A1 or US2014/0271642A1), an anti-Respiratory syncytial virus antibody (e.g. anti-RSV antibody as described in U.S. Pat. Appln. Pub. No. US2014/0271653A1), an anti-Cluster of differentiation 3 (e.g. an anti-CD3 antibody, as described in U.S. Pat. Appln. Pub. Nos. US2014/0088295A1 and US20150266966A1, and in U.S. application Ser. No. 62/222,605), an anti-Cluster of differentiation 20 (e.g. an anti-CD20 antibody as described in U.S. Pat. Appln. Pub. Nos. US2014/0088295A1 and US20150266966A1, and in U.S. Pat. No. 7,879,984), an anti-CD19 antibody, an anti-CD28 antibody, an anti-Cluster of Differentiation-48 (e.g. anti-CD48 antibody as described in U.S. Pat. No. 9,228,014), an anti-Fel d1 antibody (e.g. as described in U.S. Pat. No. 9,079,948), an anti-Middle East Respiratory Syndrome virus (e.g. an anti-MERS antibody as described in U.S. Pat. Appln. Pub. No. US2015/0337029A1), an anti-Ebola virus antibody (e.g. as described in U.S. Pat. Appln. Pub. No. US2016/0215040), an anti-Zika virus antibody, an anti-Lymphocyte Activation Gene 3 antibody (e.g. an anti-LAG3 antibody, or an anti-CD223 antibody), an anti-Nerve Growth Factor antibody (e.g. an anti-NGF antibody as described in U.S. Pat. Appln. Pub. No. US2016/0017029 and U.S. Pat. Nos. 8,309,088 and 9,353,176) and an anti-Activin A antibody. In some embodiments, the bispecific antibody is selected from the group consisting of an anti-CD3×anti-CD20 bispecific antibody (as described in U.S. Pat. Appln. Pub. Nos. US2014/0088295A1 and US20150266966A1), an anti-CD3×anti-Mucin 16 bispecific antibody (e.g., an anti-CD3×anti-Muc16 bispecific antibody), and an anti-CD3× anti-Prostate-specific membrane antigen bispecific antibody (e.g., an anti-CD3×anti-PSMA bispecific antibody). In some embodiments, the protein of interest is selected from the group consisting of abciximab, adalimumab, adalimumab-atto, ado-trastuzumab, alemtuzumab, alirocumab, atezolizumab, avelumab, basiliximab, belimumab, benralizumab, bevacizumab, bezlotoxumab, blinatumomab, brentuximab vedotin, brodatumab, canakinumab, capromab pendetide, certolizumab pegol, cemiplimab, cetuximab, denosumab, dinutuximab, dupilumab, durvalumab, eculizumab, elotuzumab, emicizumab-kxwh, emtansinealirocumab, evinacumab, evolocumab, fasinumab, golimumab, guselkumab, ibritumomab tiuxetan, idarucizumab, infliximab infliximab-abda, infliximab-dyyb, ipilimumab, ixekizumab, mepolizumab, necitumumab, nesvacumab, nivolumab, obiltoxaximab, obinutuzumab, ocrelizumab, ofatumumab, olaratumab, omalizumab, panitumumab, pembrolizumab, pertuzumab, ramucirutnab, ranibizumab, raxibacumab, reslizumab, rinucumab, rituximab, sarilumab, secukinumab, siltuximab, tocilizumab, tocilizumab, trastuzumab, trevogrumab, ustekinumab, and vedolizumab.

In some embodiments, the protein of interest is a recombinant protein that contains an Fc moiety and another domain, (e.g., an Fe-fusion protein). In some embodiments, an Fc-fusion protein is a receptor Fc-fusion protein, which contains one or more extracellular domain(s) of a receptor coupled to an Fc moiety. In some embodiments, the Fc moiety comprises a hinge region followed by a CH2 and CH3 domain of an IgG. In some embodiments, the receptor Fc-fusion protein contains two or more distinct receptor chains that bind to either a single ligand or multiple ligands. For example, an Fc-fusion protein is a TRAP protein, such as for example an IL-1 trap (e.g., rilonacept, which contains the IL-1RAcP ligand binding region fused to the Il-1R1 extracellular region fused to Fc of hIgG1; see U.S. Pat. No. 6,927,004, which is herein incorporated by reference in its entirety), or a VEGF trap (e.g., aflibercept or ziv-aflibercept, which comprises the Ig domain 2 of the VEGF receptor Flt1 fused to the Ig domain 3 of the VEGF receptor Flk1 fused to Fc of hIgG1; see U.S. Pat. Nos. 7,087,411 and 7,279,159). In other embodiments, an Fc-fusion protein is a Scfv-Fc-fusion protein, which contains one or more of one or more antigen-binding domain(s), such as a variable heavy chain fragment and a variable light chain fragment, of an antibody coupled to an Fc moiety.

IV. Cell Culture

The cell cultures describe herein can be a "fed-batch cell culture" or "fed-batch culture" which refers to a batch culture wherein the cells and culture medium are supplied to the culturing vessel initially, and additional culture nutrients are slowly fed, in discrete increments, to the culture during culturing, with or without periodic cell and/or product harvest before termination of culture. Fed-batch culture includes "semi-continuous fed-batch culture" wherein periodically whole culture (which may include cells and medium) is removed and replaced by fresh medium. Fed-batch culture is distinguished from simple "batch culture" whereas all components for cell culturing (including the animal cells and all culture nutrients) are supplied to the culturing vessel at the start of the culturing process in batch culture. Fed-batch culture may be different from "perfusion culture" insofar as the supernatant is not removed from the culturing vessel during a standard fed-batch process, whereas in perfusion culturing, the cells are restrained in the culture by, e.g., filtration, and the culture medium is continuously or intermittently introduced and removed from the culturing vessel. However, removal of samples for testing purposes during fed-batch cell culture is contemplated. The fed-batch process continues until it is determined that maximum working volume and/or protein production is reached, and protein is subsequently harvested.

The cell culture can be a "continuous cell culture" which is a technique used to grow cells continually, usually in a particular growth phase. For example, if a constant supply of cells is required, or the production of a particular protein of interest is required, the cell culture may require maintenance in a particular phase of growth. Thus, the conditions must be continually monitored and adjusted accordingly in order to maintain the cells in that particular phase.

The cells are cultured in cell culture medium. The terms "cell culture medium" and "culture medium" refer to a nutrient solution used for growing mammalian cells that typically provides the necessary nutrients to enhance growth of the cells, such as a carbohydrate energy source, essential (e.g. phenylalanine, valine, threonine, tryptophan, methionine, leucine, isoleucine, lysine, and histidine) and nonessential (e.g. alanine, asparagine, aspartic acid, cysteine, glutamic acid, glutamine, glycine, proline, serine, and tyrosine) amino acids, trace elements, energy sources, lipids, vitamins, etc. Cell culture medium may contain extracts, e.g. serum or peptones (hydrolysates), which supply raw materials that support cell growth. Media may contain yeast-derived or soy extracts, instead of animal-derived extracts. Chemically defined medium refers to a cell culture medium in which all of the chemical components are known (i.e. have a known chemical structure). Chemically defined medium is entirely free of animal-derived components, such as serum- or animal-derived peptones. In one embodiment, the medium is a chemically defined medium.

The solution may also contain components that enhance growth and/or survival above the minimal rate, including hormones and growth factors. The solution may be formulated to a pH and salt concentration optimal for survival and proliferation of the particular cell being cultured.

A "cell line" refers to a cell or cells that are derived from a particular lineage through serial passaging or subculturing of cells. The term "cells" is used interchangeably with "cell population".

The term "cell" includes any cell that is suitable for expressing a recombinant nucleic acid sequence. Cells include those of prokaryotes and eukaryotes, such as bacterial cells, mammalian cells, human cells, non-human animal cells, avian cells, insect cells, yeast cells, or cell fusions such as, for example, hybridomas or quadromas. In certain embodiments, the cell is a human, monkey, ape, hamster, rat or mouse cell. In other embodiments, the cell is selected from the following cells: Chinese Hamster Ovary (CHO) (e.g., CHO K1, DXB-11 CHO, Veggie-CHO), COS (e.g., COS-7), retinal cell, Vero, CV1, kidney (e.g., HEK293, 293 EBNA, MSR 293, MDCK, HaK, BHK21), HeLa, HepG2, WI38, MRC 5, Colo25, HB 8065, HL-60, lymphocyte, e.g. Jurkat (T lymphocyte) or Daudi (B lymphocyte), A431 (epidermal), U937, 3T3, L cell, C127 cell, SP2/0, NS-0, MMT cell, stem cell, tumor cell, and a cell line derived from an aforementioned cell. In some embodiments, the cell comprises one or more viral genes, e.g., a retinal cell that expresses a viral gene (e.g., a PER.C6® cell). In some embodiments, the cell is a CHO cell. In other embodiments, the cell is a CHO K1 cell.

EXAMPLES

Example 1: Identification of Virus without Amplification

Materials and Methods

Murine Adenovirus 1 (MAV1) (a ~30,000 bp dsDNA virus) was grown for 7 days on CHO-K1 indicator cells. Cell flasks were frozen overnight and then thawed prior to use for VERA optimization studies. Library preparation was performed with either SQK-LSK308 (1D2) or SQK-RAD004 (Rapid) ONT library preparation kits following manufacturer's instructions. SQK-RAD004 is a 15 minute rapid library preparation kit while SQK-LSK308 is a longer (~3 hr) more robust library preparation. Data was analyzed using ONT's WIMP software, a platform that aligns reads to viral, bacterial, and fungal databases from RefSeq and is periodically updated. Corresponding "Eukaryotic" or "Bacterial" alignments represent false positives most likely derived from partial alignments of CHO (host) reads to the Fungal (Eukaryotic) database.

Results

Initial work focused on incorporating random PCR techniques to amplify the remaining low amounts of viral nucleic acid from stock viral titers. This resulted in a large amount of total reads available for sequencing but also amplified any residual host nucleic acid complicating the post-sequencing data analysis. Without amplification it was difficult to sequence a large amount native viral reads. VERA plus random priming increases viral read alignment but not as efficiently as using targeted PCR primers (FIG. 2).

In another experiment two DNA viruses (MVM and MAV1) were grown on CHO-K1 cells for seven days. The methods from above were performed on the cells. Sequencing reads were filtered at Q>7 (~80% accuracy) and all passable reads were analyzed in Real-time. Majority of reads correspond to spiked virus (>98% of total reads). As can be seen in Table 2, VERA protocol effectively removes host cell background to sequence native viral reads and could identify contaminants in <5 minutes.

Example 2: Filtration of Samples

Figure 3A:
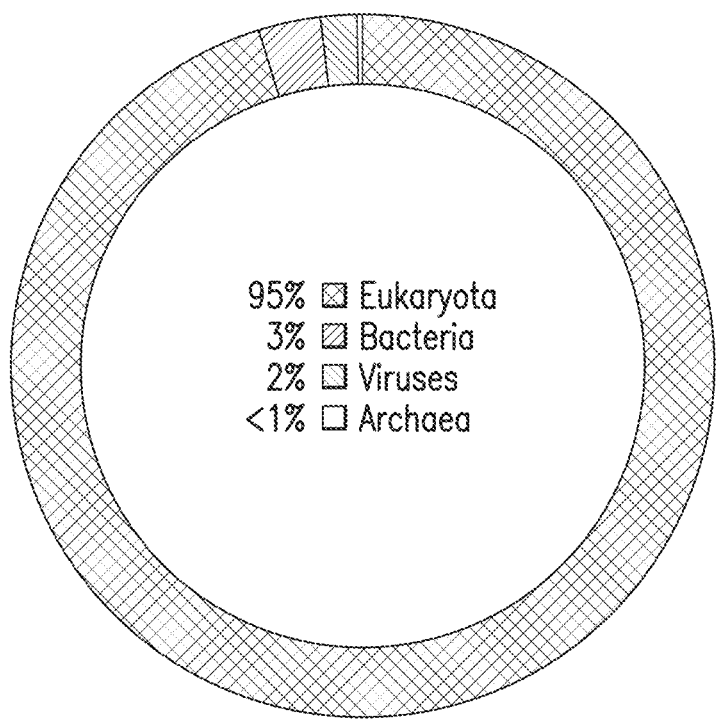
FIG. 3A is a diagram showing 95% of the reads are eukaryotic (corresponding to the host) and 2% are viruses when taken from the retentate.
Figure 3B:
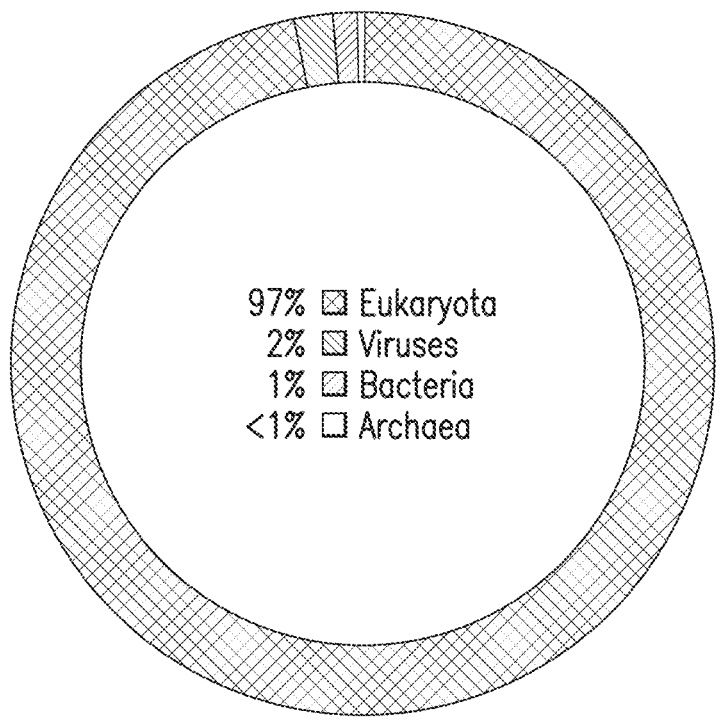
FIG. 3B is a diagram showing 97% of the reads are eukaryotic and 2% are viruses when the sample is treated with nucleases.

A 0.22 μm filter was used to better trap host cell debris (i.e., nucleus). Two samples were prepared from this initial VERA procedure (Test #1A and Test #1B). Test #1A attempted to sequence the remaining retentate from VERA (FIG. 1, Step D) which did not undergo any nuclease treatment. Test #1B sequenced the sample following a nuclease cocktail treatment (OmniCleave+RiboShredder) to test if more viral sequenced reads increased following nuclease treatment to digest host nucleic acid (FIG. 1, Step E). Neither preparation produced any viral identification. To rescue any residual reads not identified the random PCR technique from FIG. 2 was used and correctly identify MAV1 reads. However, sequencing metrics for MAV1 were unchanged between the two preparations with total viral reads only representing 2% of total aligned reads (FIGS. 3A and 3B).

In another experiment the 0.22 μm filter was replaced with a larger 0.45 μm filter. Aliquots of separate nuclease treatments from the VERA procedure were sequenced, RNAse I only (Test #2A) or the commercially available OmniCleave nuclease cocktail (Test #2B). These individual treatments each were able to identify MAV1 but only from a limited number of reads. The majority of the reads mapped to eukaryotic organisms indicating that neither nuclease treatment was sufficient enough to completely remove host nucleic acid that could correlate to library preparation issues as <1% mapped reads were from MAV1. A random PCR strategy was not attempted as in Test #1.

Example 3: Nuclease Treatment

Figure 4:
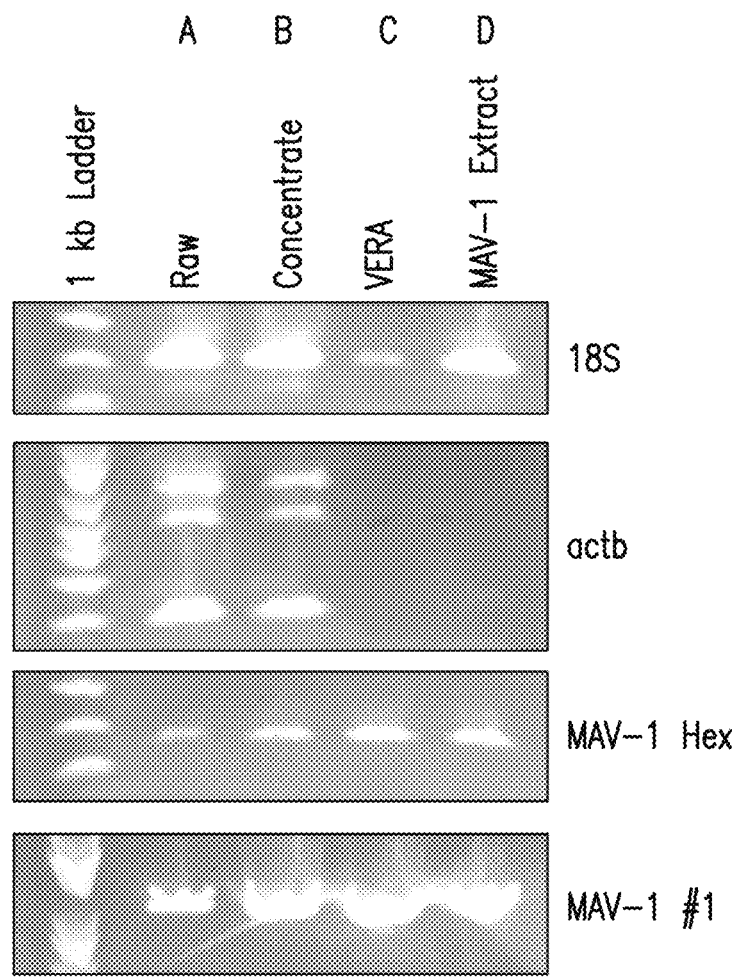
FIG. 4 is an ethidium bromide gel showing that the majority of eukaryotic DNA is removed using VERA.
Figure 5A:
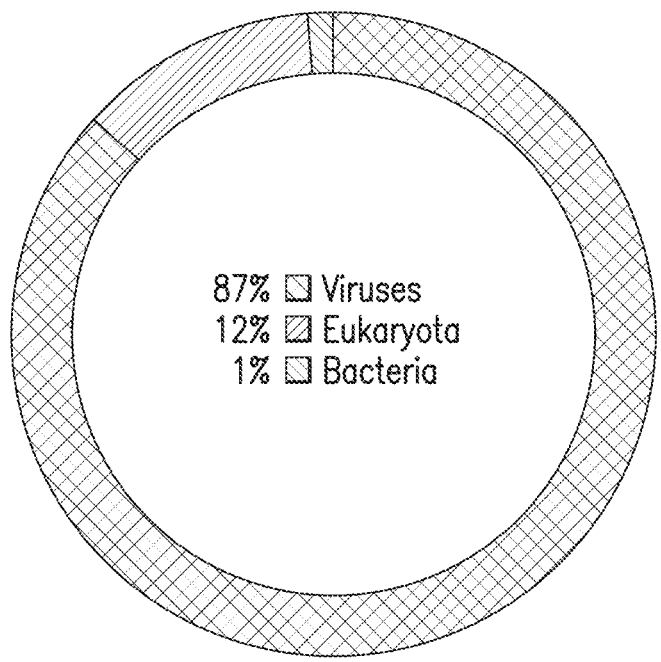
FIG. 5A is a diagram showing 87% of the total reads are viruses and 12% are eukaryotic when the sample is treated with a combination of Benzonase®, OmniCleave™, and RiboShredder™.
Figure 5B:
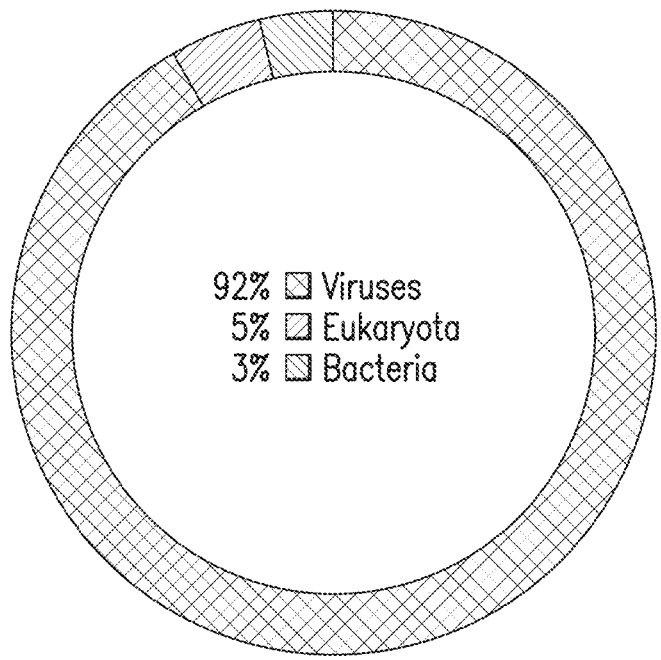
FIG. 5B is a diagram showing 92% of the total reads are viruses and 5% are eukaryotic when the sample is treated with a combination of Benzonase®, OmniCleave™, and RiboShredder™.

In another experiment the 0.45 μm filter was retained and the sample was treated with a nuclease cocktail of (i) Benzonase®, (ii) OmniCleave™, and (iii) RiboShredder™. To the 50 μL of buffer exchanged retentate from Step 4.5 above, 100 μL OmniCleave, 100 μL Benzonase, 100 μL RiboShredder, and 35 μL of 10× DNase buffer was added. The samples were incubated in a thermomixer at 37° C. at 500 RPM for 2 hours. A 2:1 nuclease:retentate is preferred. This combination cocktail was sufficient to remove CHO gDNA, mRNA, and a majority of rRNA (FIG. 4). Sequencing duplicate preparations of the VERA protocol using this combination of nuclease treatment yielded a gross increase in total viral reads. An increase of 87% and 92% of total reads mapped to MAV1, indicating that host nucleic acid reduction had been achieved (FIGS. 5A and 5B).

Example 4: Automated Extraction

DNA viruses (MVM, PI2, REO2, and/or MAV-1) were spiked into CHO-K1 cells. Phenol/chloroform extraction was performed on CHO-K1 cells spiked with virus after the cells were subjected to ultracentrifugation. Automated extraction of DNA was performed on CHO-K1 cells spiked with virus after the cells were subjected to the VERA protocol. Automated extraction was performed using the iPreprm PureLink™ Virus Kit for the iPrep™ Purification Instrument which is pre-programmed with the purification protocol that directs the volume of reagents used and incubation time. As can be seen in Table 3, automated extraction reduced viral enrichment. However, a high proportion of host reads remained following ultracentrifugation.

TABLE 1

Raw Data

| Test | Description | Library Kit | Average read length | Average Quality Score | Total # of reads | Corresponding MAV1 reads | % Viral Reads (MAV1) | Top Alignment (Species) | MAV1 Identification (Y/N) |
|---|---|---|---|---|---|---|---|---|---|
| #1A | Amicon ® Retentate + random PCR | 1D$^2$ | 589 | 10.69 | 355,669 | 81 | 2 | *Phycomyces blakesleeanus* | Y-not top hit |
| #1B | Nuclease treated + random PCR | 1D$^2$ | 1,139 | 8.97 | 53,815 | 27 | 2 | *Phycomyces blakesleeanus* | Y-not top hit |
| #2A | VERA (RNAse I only) | SQK-RAD004 | 589 | 9.26 | 4,951 | 1 | <1 | *leotiomyeta* | Y-not top hit |
| #2B | VERA (OmniCleave only) | SQK-RAD004 | 947 | 8.04 | 854 | 7 | <1 | *leotiomyeta* | Y-not top hit |
| #3A | VERA with Complete Nuclease cocktail | SQK-RAD004 | 693 | 10.37 | 867 | 342 | 87 | MAV1 | Y |
| #3B | VERA with Complete Nuclease cocktail | SQK-RAD004 | 663 | 8.08 | 251 | 81 | 92 | MAV1 | Y |

TABLE 2

Raw Data

| Virus | Average length | Average quality score | Total passed reads | Reads classified | Reads unclassified | # of target reads | Viral % of total reads |
|---|---|---|---|---|---|---|---|
| MAV1 | 1559 | 9.54 | 6,841 | 5,747 | 1,092 | 5,574 | 98 |
| MAV1 | 910 | 8.88 | 23,192 | 15,646 | 7,488 | 15,201 | 98 |
| MAV1 | 1,307 | 9.27 | 8,275 | 6,948 | 1,320 | 6,850 | 99 |
| MVM | 646 | 8.86 | 4,821 | 3,506 | 1,306 | 3,387 | 97 |
| MVM | 712 | 8.31 | 20,065 | 17,442 | 2,623 | 17,353 | 100 |
| MVM | 519 | 8.88 | 11,507 | 7,610 | 3,866 | 7,515 | 99 |

TABLE 3

Automated Extraction Raw Data.

| | MVM | PI2 | REO2 | MVM | MAV-1 | PI2 | REO2 |
|---|---|---|---|---|---|---|---|
| Host Cell | | | | | | | |
| | CHO-K1 | | | CHO-K1 | | | |
| Sample Preparation | | | | | | | |
| | VERA with automated extraction | | | Spiked Virus w/ ultracentrifugation in Glucose gradient | | | |
| Extraction Method | | | | | | | |
| | AB Viral DNA/RNA iPrep Kit | | | Phenol Chloroform/Ethanol Precipitation | | | |
| Analyzed Reads | 35,554 | 129,830 | 8,801 | 273,807 | 246,410 | 208,862 | 182,783 |
| Classified Read | 13,909 | 21,769 | 824 | 98,415 | 98,122 | 95,623 | 82,299 |
| Unclassified Reads | 21,645 | 108,061 | 7,977 | 175,392 | 148,288 | 113,239 | 100,484 |
| % Classified | 39 | 17 | 9 | 36 | 40 | 46 | 45 |
| Mean Quality | 9.99 | 9.08 | 9.96 | 9.88 | 10.10 | 9.86 | 9.70 |
| Mean Length | 646.2 | 581.6 | 819.3 | 1,067 | 989.3 | 1,042 | 1,089 |
| Host Reads | 10,211 | 17,593 | 608 | 70,928 | 74,650 | 78,453 | 67,774 |

TABLE 3-continued

Automated Extraction Raw Data.

| | Virus | | | | | | |
|---|---|---|---|---|---|---|---|
| | MVM | PI2 | REO2 | MVM | MAV-1 | PI2 | REO2 |
| | Host Cell | | | | | | |
| | CHO-K1 | | | CHO-K1 | | | |
| | Sample Preparation | | | | | | |
| | VERA with automated extraction | | | Spiked Virus w/ ultracentrifugation in Glucose gradient | | | |
| | Extraction Method | | | | | | |
| | AB Viral DNA/RNA iPrep Kit | | | Phenol Chloroform/Ethanol Precipitation | | | |
| Virus Reads | 2,402 | 111 | 20 | 3,158 | 184 | 46 | 0 |
| % Virus vs Host | 23.52 | 0.63 | 3.29 | 4.45 | 0.25 | 0.06 | 0.00 |
| % Viral Enrichment | 6.76 | 0.09 | 0.23 | 1.15 | 0.07 | 0.02 | 0.00 |

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

All references cited herein are incorporated by reference in their entirety. The present invention may be embodied in other specific forms without departing from the spirit or essential attributes thereof and, accordingly, reference should be made to the appended claims, rather than to the foregoing specification, as indicating the scope of the invention.

We claim:

1. An amplification-free method for identifying a virus in a sample of a cell culture by reduction of host genomic material, comprising:
   lysing eukaryotic cells in the sample of a cell culture;
   removing cellular debris from the sample;
   concentrating the sample via diafiltration to produce a retentate;
   treating the retentate with more than one nuclease to degrade eukaryotic nucleic acids, wherein the more than one nuclease is one or more endonucleases and one or more RNases;
   extracting viral nucleic acids from the nuclease-treated retentate;
   preparing a library of the extracted viral nucleic acids for sequencing; and
   sequencing the extracted viral nucleic acids from the prepared library without amplifying the extracted viral nucleic acids; and
   identifying the virus in the sample.

2. The method of claim 1, wherein the eukaryotic cells comprise Chinese Hamster Ovary cells.

3. The method of claim 1, wherein the eukaryotic cells secrete a protein drug product.

4. The method of claim 3, wherein the protein drug product is selected from the group consisting of an antibody, antigen binding antibody fragment, a fusion protein, and a recombinant protein.

5. The method of claim 1, further comprising the step of treating the cell culture to remove the identified virus.

6. The method of claim 1, wherein the cells are lysed using a freeze-thaw technique.

7. The method of claim 1, wherein the step of removing cellular debris comprises centrifuging the lysed sample to produce a supernatant and filtering the supernatant to remove cellular debris from the sample.

8. The method of claim 1, wherein the virus is an RNA virus.

9. The method of claim 1, wherein the virus is selected from the group consisting of Minute virus of mice (MVM), K virus, Mouse Encephalomyelitis virus, Mouse Adenovirus, MAV1, murine leukemia virus, Encephalomyocarditis (EMC), lactate dehydrogenase virus (LDV), Polyoma virus, mouse hepatitis virus (MHV) Sendai virus, lymphocytic choriomeningitis virus (LCM), Reo-virus type 3, Kilham rat virus, and Toolan's H-1 virus.

10. An amplification-free method for detecting viral nucleic acids in a cell culture sample by reduction of host genomic material, comprising:
    lysing cells in the cell culture sample to produce cellular debris;
    separating the cellular debris to produce a supernatant;
    concentrating the supernatant via diafiltration to produce a retentate;
    treating the retentate with more than one nuclease, wherein the more than one nuclease is one or more endonucleases and one or more RNases, thereby degrading the eukaryotic nucleic acids;
    extracting viral nucleic acids from the nuclease-treated retentate;
    preparing a library of the extracted viral nucleic acids for sequencing; and
    sequencing the viral nucleic acids from the prepared library without amplifying the extracted viral nucleic acids, wherein
    viral nucleic acid reads obtained from the sequencing are greater than the cellular nucleic acid reads obtained from the sequencing; and
    identifying the virus in the sample.

11. The method of claim 10, wherein the viral nucleic acid reads are at least 51% of the total reads obtained from the sequencing.

12. The method of claim 10, wherein the viral nucleic acid reads are between 50 to 99% of the total reads obtained from the sequencing.

13. The method of claim 10, wherein the viral nucleic acid reads are at least 80% of the total reads obtained from the sequencing.

14. The method of claim 10, wherein the viral nucleic acid reads are at least 85% of the total reads obtained from the sequencing.

15. The method of claim 10, wherein the viral nucleic acid reads are at least 90% of total reads obtained from the sequencing.

16. The method of claim 10, wherein the virus is an RNA virus.

17. The method of claim 1, wherein the sequencing of the extracted viral nucleic acids from the library is completed within 8 hours.

18. The method of claim 1, wherein the sequencing is real-time nanopore sequencing.

19. The method of claim 1, wherein viral nucleic acid reads obtained from the sequencing are at least 51% of the total reads obtained from the sequencing.

20. The method of claim 1, wherein viral nucleic acid reads obtained from the sequencing are at least 90% of the total reads obtained from the sequencing.

21. The method of claim 1, wherein the library of the viral nucleic acids is prepared within 15 minutes.

22. The method of claim 1, wherein the more than one nuclease comprises two to five nucleases or nuclease mixtures.

23. The method of claim 10, wherein the more than one nuclease comprises two to five nucleases or nuclease mixtures.

\* \* \* \* \*